US008743681B2

(12) United States Patent
Omar

(10) Patent No.: US 8,743,681 B2
(45) Date of Patent: Jun. 3, 2014

(54) FAULT-TOLERANCE AND RESOURCE MANAGEMENT IN A NETWORK

(75) Inventor: Hassan M. Omar, Mt. Vernon, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 676 days.

(21) Appl. No.: 12/838,575

(22) Filed: Jul. 19, 2010

(65) Prior Publication Data

US 2012/0017110 A1 Jan. 19, 2012

(51) Int. Cl.
*H04L 12/26* (2006.01)
*H04L 12/24* (2006.01)

(52) U.S. Cl.
CPC .................................. *H04L 41/0672* (2013.01)
USPC .......................................................... 370/228

(58) Field of Classification Search
CPC ............ H04L 41/0663; H04L 41/1299; H04L 43/081; H04L 43/101; H04L 12/5695
USPC ................... 370/216, 230, 400, 228; 709/239
See application file for complete search history.

(56) References Cited

U.S. PATENT DOCUMENTS

2002/0045443 A1* 4/2002 Hunzinger .................... 455/421
2002/0131424 A1* 9/2002 Suemura ....................... 370/400
2004/0190445 A1* 9/2004 Dziong et al. ................ 370/225
2005/0213531 A1* 9/2005 Nanda ........................... 370/328
2007/0091795 A1* 4/2007 Bonaventure et al. ........ 370/228
2007/0165518 A1* 7/2007 Bruckman et al. ............ 370/222
2007/0168486 A1* 7/2007 McCoy et al. ................ 709/223
2011/0141877 A1* 6/2011 Xu et al. ....................... 370/216

* cited by examiner

*Primary Examiner* — Pao Sinkantarakorn
*Assistant Examiner* — Richard K Chang

(57) ABSTRACT

A method including receiving network topology and resource management information; generating a mapping between the network topology of a network and resource reservation paths associated with flows using the network based on the network topology and resource management information; generating a failure recovery plan (FRP) based on the mapping, wherein the FRP instructs one or more other network devices on how to manage a failure such that one or more resource reservation paths associated with flows impacted by the failure are not deleted; and loading the FRP on the one or more other network devices.

22 Claims, 15 Drawing Sheets

FAULT-TOLERANCE AND RESOURCE MANAGEMENT IN A NETWORK

BACKGROUND

Mission critical applications require a network to support reliable service, and users expect to receive the agreed-on level of experience even when the network experiences a failure. As a result, network operators and service providers must confront a host of challenges to ensure that quality of service (QOS) and other performance metrics are maintained even when a failure occurs.

DETAILED DESCRIPTION OF PREFERRED EMBODIMENTS

Figure 1A:
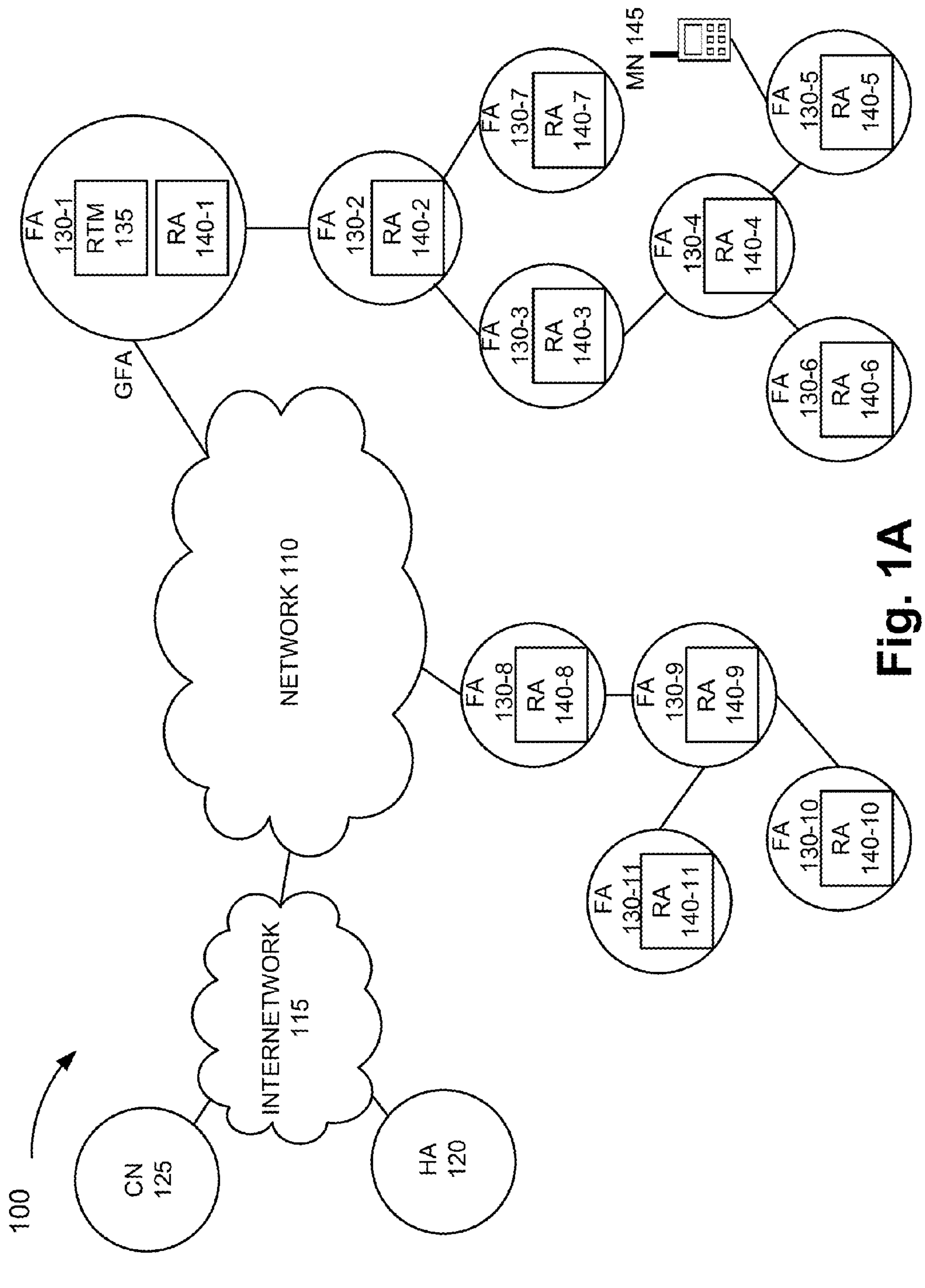
FIG. 1A is a diagram illustrating an exemplary network in which fault-tolerance and resource management recovery may be implemented.

The following detailed description refers to the accompanying drawings. The same reference numbers in different drawings may identify the same or similar elements. Also, the following detailed description does not limit the invention.

Applications typically require a QoS to support real-time types of sessions. Network operators and service providers may use resource allocation schemes to manage desired resources along intended network paths. For example, the Mobile-Internet Protocol (IP) protocol supports the mobility of users without the need to tear down established sessions. In a mobile environment, such as, for example, Hierarchical Mobile IP (HMIP), restoring connectivity may not be sufficient to restore forwarding and QoS treatment upon failure events.

Typically, a resource management system models a network path between the source and destination as a series of intermediate points. The resource management system tracks resources, such as bandwidth, associated with the network devices and the links along the network path. The failure of a network device and/or a link can impact both traffic forwarding and accuracy of current resource tracking information. The resource management system will remove a broken network path and create a new network path when a failure occurs. In many instances, the resource management system may track sessions and flows (e.g., through an application specific interface). In the case of a failure event, however, the removal of existing flows and corresponding reserved resources can result in service outage and information loss.

According to exemplary embodiments, the impact of a failure to a network may be minimized based on the integration between fault recovery and resource management. According to an exemplary embodiment, the failure may be managed without the need for a resource management system to remove a broken network path. According to an exemplary embodiment, neighbor network devices may cooperate in detecting and compensating for the failure. Additionally, state information may be maintained to ensure that QoS levels are preserved, to the extent possible, during the failure. For example, policy-based rules may be used to optimize resource utilization and provide multiple grades of service levels and fault tolerant levels.

According to the exemplary embodiments, network operators and service providers may provide a high level of fault tolerance in their networks. For example, services may be tailored to offer multiple levels of recovery support to meet a wide range of requirements associated with mission-critical applications and/or demanding applications. By way of example, differentiated treatment models may be used with respect to a tiered billing system. QoS associated with services, such as, for example, gaming, gaming software burst download service, bandwidth on demand, Voice over IP, video on demand, video/IP, IP television, internet access, virtual private network (VPN), and other types of services may be significantly improved.

FIG. 1A is a diagram illustrating an exemplary network 100 in which fault-tolerance and resource management recovery may be implemented. By way of example, network 100 may correspond to a HMIP network. According to other embodiments, network 100 may correspond to a different type of wireless network (e.g., cellular network, mobile network, non-cellular network) or wired network. For example, according to other embodiments, network 100 may correspond to a Long Term Evolution (LTE) network, a Global System for Mobile Communications (GSM) network, a Universal Mobile Telecommunication System (UMTS) network, a Wideband Code Division Multiple Access (WCDMA) network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, and/or another type of wireless network (e.g., an ad hoc network, etc.), or some other type of wired network.

As illustrated in FIG. 1A, exemplary network 100 may include a network 110, an internetwork 115, a home agent (HA) 120, a correspondent node (CN) 125, and a plurality of foreign agents (FAs) 130-1 through 130-11 (referred to generally as FAs 130 or FA 130). FAs 130 may include recovery agents (RAs) 140-1 through 140-11 (referred to generally as RAs 140 or RA 140). As illustrated, FA 130-1 may also include a resource and topology manager (RTM) 135. Additionally, FA 130-1 may act as a gateway foreign agent (GFA). Mobile node (MN) 145 may attach to network 100 to obtain services, assets, etc.

The number of devices and configuration in network 100 is exemplary and provided for simplicity. In practice, network 100 may include more devices, fewer devices, different devices, and/or differently arranged devices than those illustrated in FIG. 1A. Additionally, or alternatively, network 100 may include additional networks, fewer networks, and/or different networks than those illustrated in FIG. 1A. Additionally, or alternatively, according to other implementations, multiple devices may be combined. For example, a device may include both HA 120 and CN 125. Also, according to other embodiments, a function described as being performed by a particular device may be performed by a different device or a combination of devices. Network 100 may include wired and/or wireless connections among the devices illustrated.

Network 110 and internetwork 115 may correspond to one or multiple networks of any type, such as a wireless network and/or a wired network. HA 120 and FA 130 may correspond to a network device, such as, for example, a router or some other network device or node capable of routing or forwarding traffic. CN 125 may correspond to a network device that communicates with MN 145 via HA 120. CN 125 may be stationary or mobile. MN 145 may include a device having the capability to communicate with other devices, systems, networks, and/or the like. For example, MN 145 may take the form of a portable device, a handheld device, or a mobile device.

RTM 135 may track current network topology and resource utilization associated with network devices (e.g., FAs 130) and links within network 100. RTM 135 may generate a failure recovery plan (FRP) for network devices within its scope. The FRP may instruct other network devices on how to manage a failure. RTM 135 may provide the FRP to network devices relevant to a recovery process that may be responsive to the failure. When there is a topology change or some other event that impacts forwarding and resource allocation, RTM 135 may update the FRP. RTM 135 will be described further below.

RA 140 may detect a failure. RA 140 may receive the FRP and execute the FRP when the failure occurs. RA 140 will be described further below.

Figure 1B:
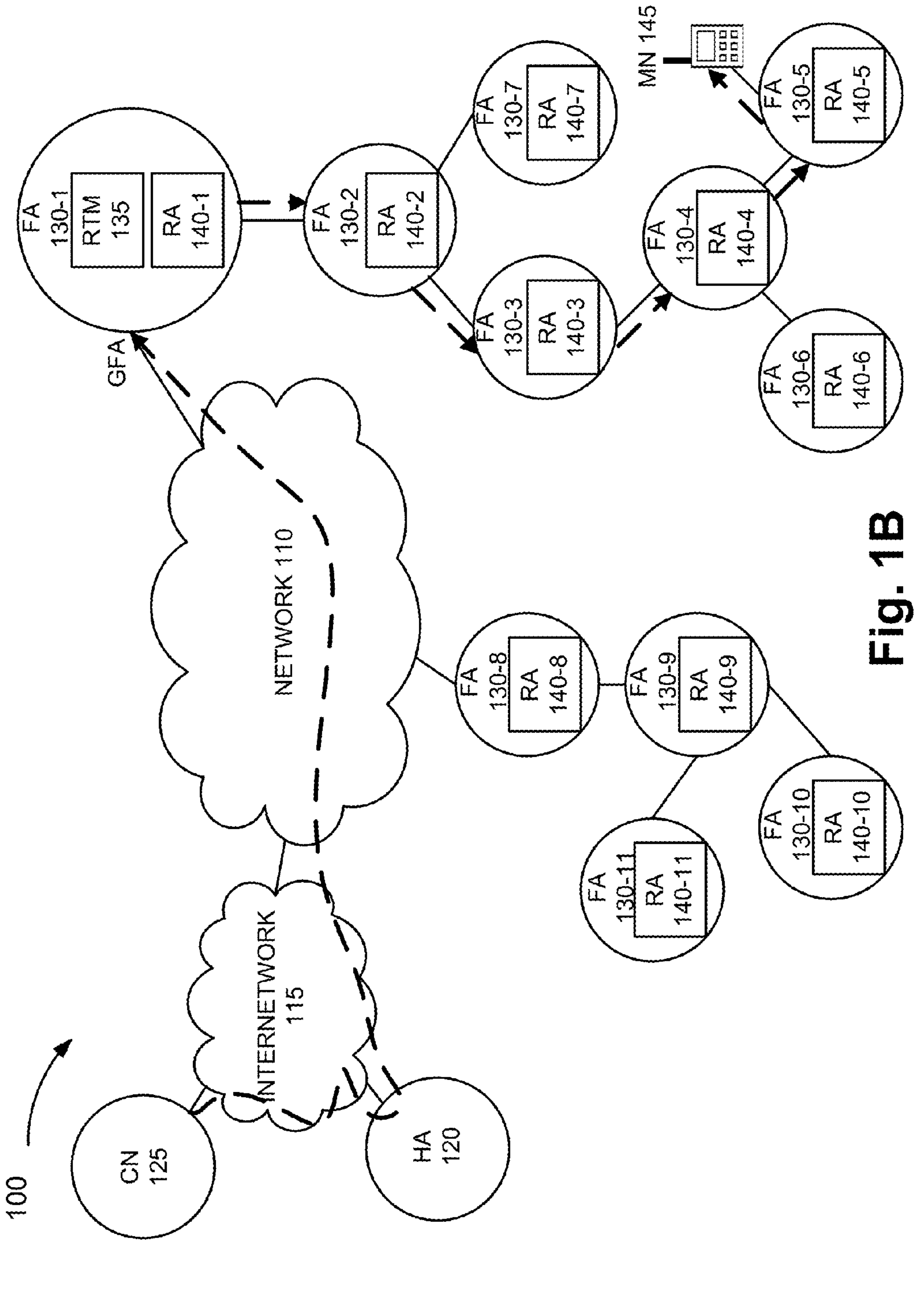
FIG. 1B is a diagram illustrating an exemplary network path.

As illustrated in FIG. 1B, according to an exemplary implementation of a HMIP network, traffic destined to MN 145 is forwarded to HA 120 by CN 125. HA 120 typically keeps track of the location of MN 145. The information related to the location of MN 145 may be distributed over a number of FAs 130 that correspond to the lineage from the GFA to the leaf FA serving MN 145. By way of example, HA 120 may have information that MN 145 is being served by FA 130-1 (the GFA). As illustrated, HA 120 may forward traffic to FA 130-1 via internetwork 115 and network 110. FA 130-1 may have information that traffic destined to MN 145 needs to be forwarded to FA 130-2. Additionally, as further illustrated, FA 130-2 may forward traffic to FA 130-3, FA 130-3 may forward traffic to FA 130-4, FA 130-4 may forward traffic to FA 130-5, and FA 130-5 may forward traffic to MN 145. During the forwarding of traffic, the network devices may perform encapsulation and decapsulation to appropriately handle forwarding headers.

Figure 1C:
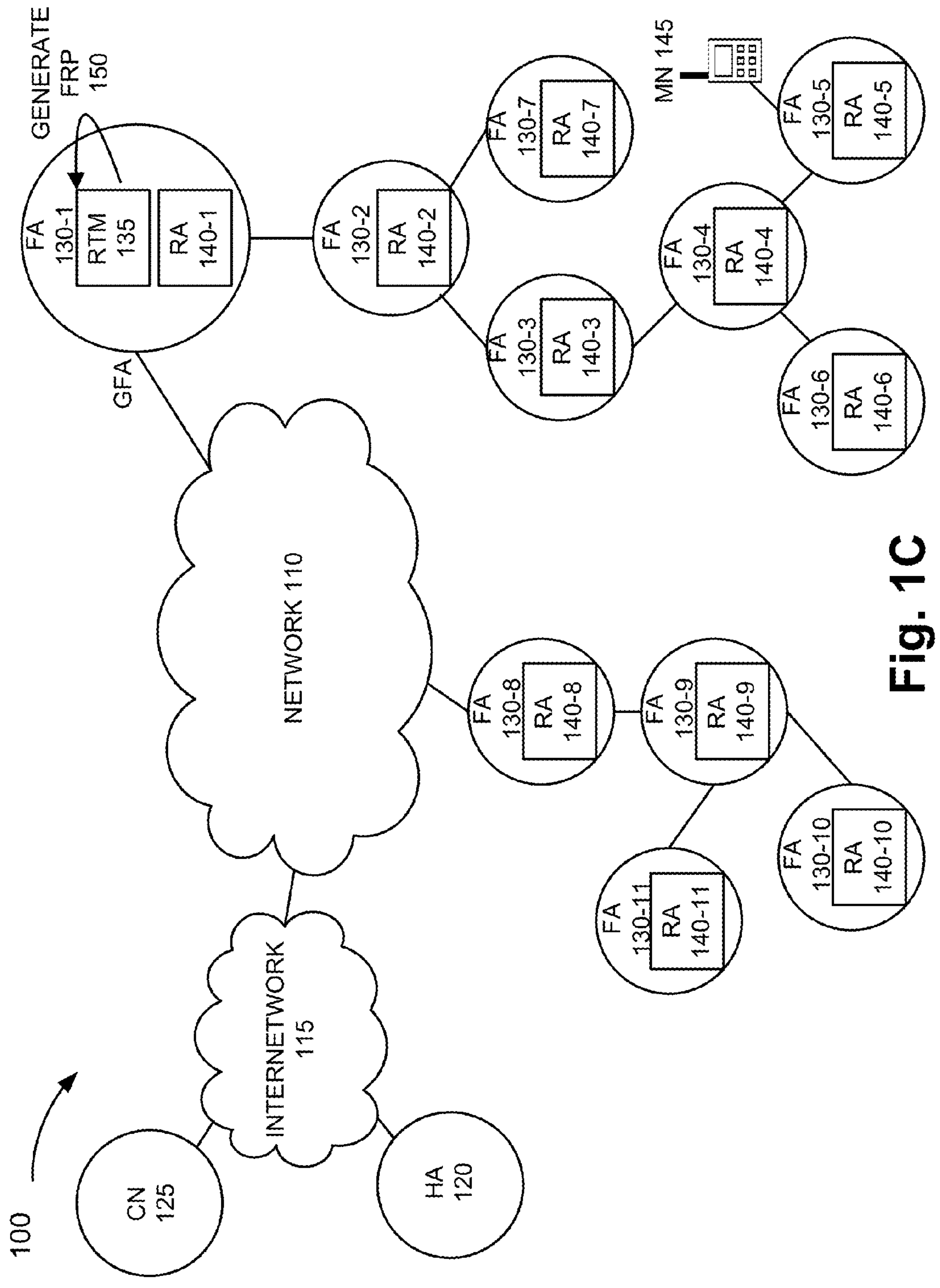
FIGS. 1C-1F are diagrams illustrating an exemplary process in which a fault-tolerant and resource management recovery may be implemented.
Figure 1D:
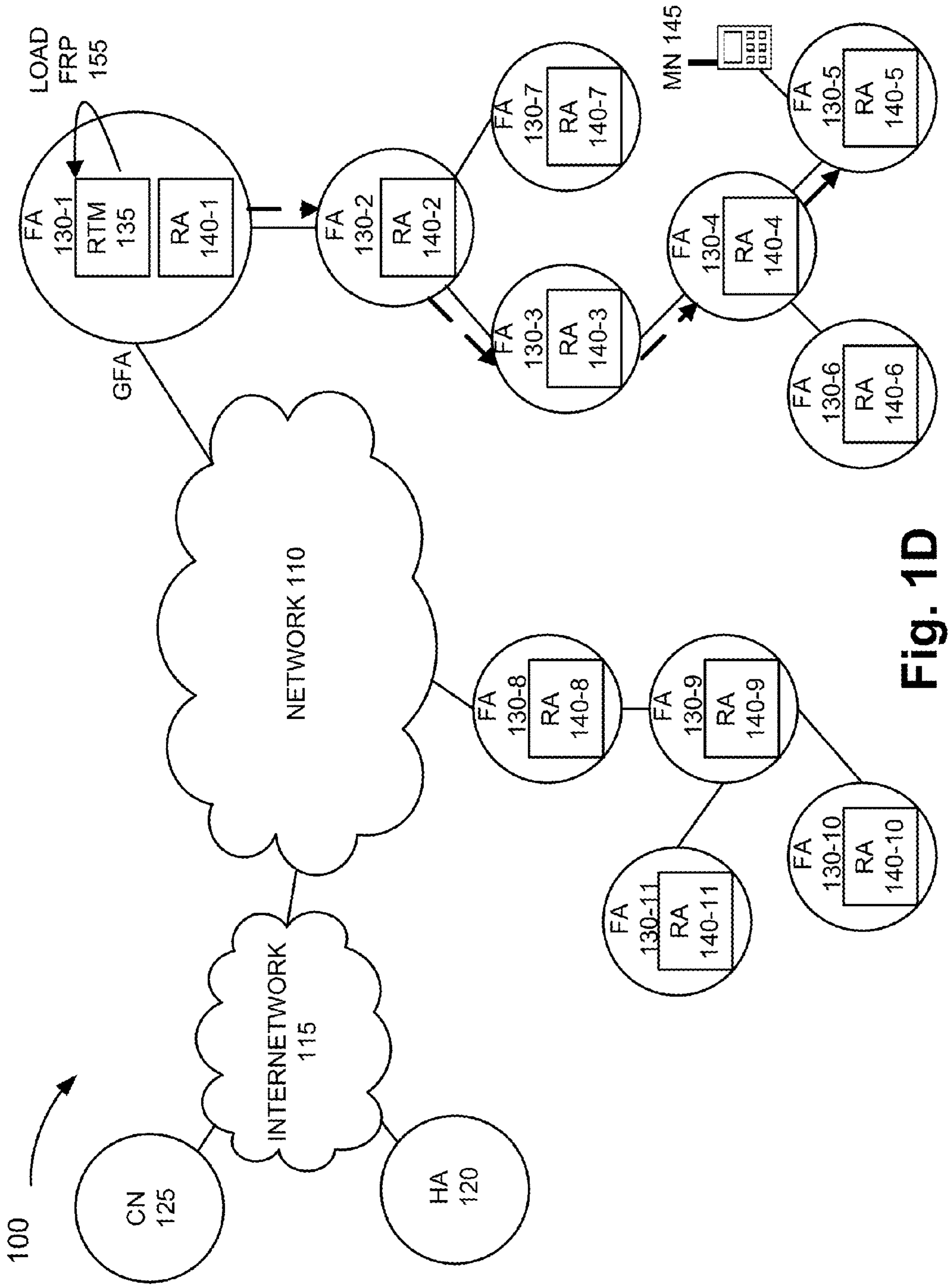
Figure 1E:
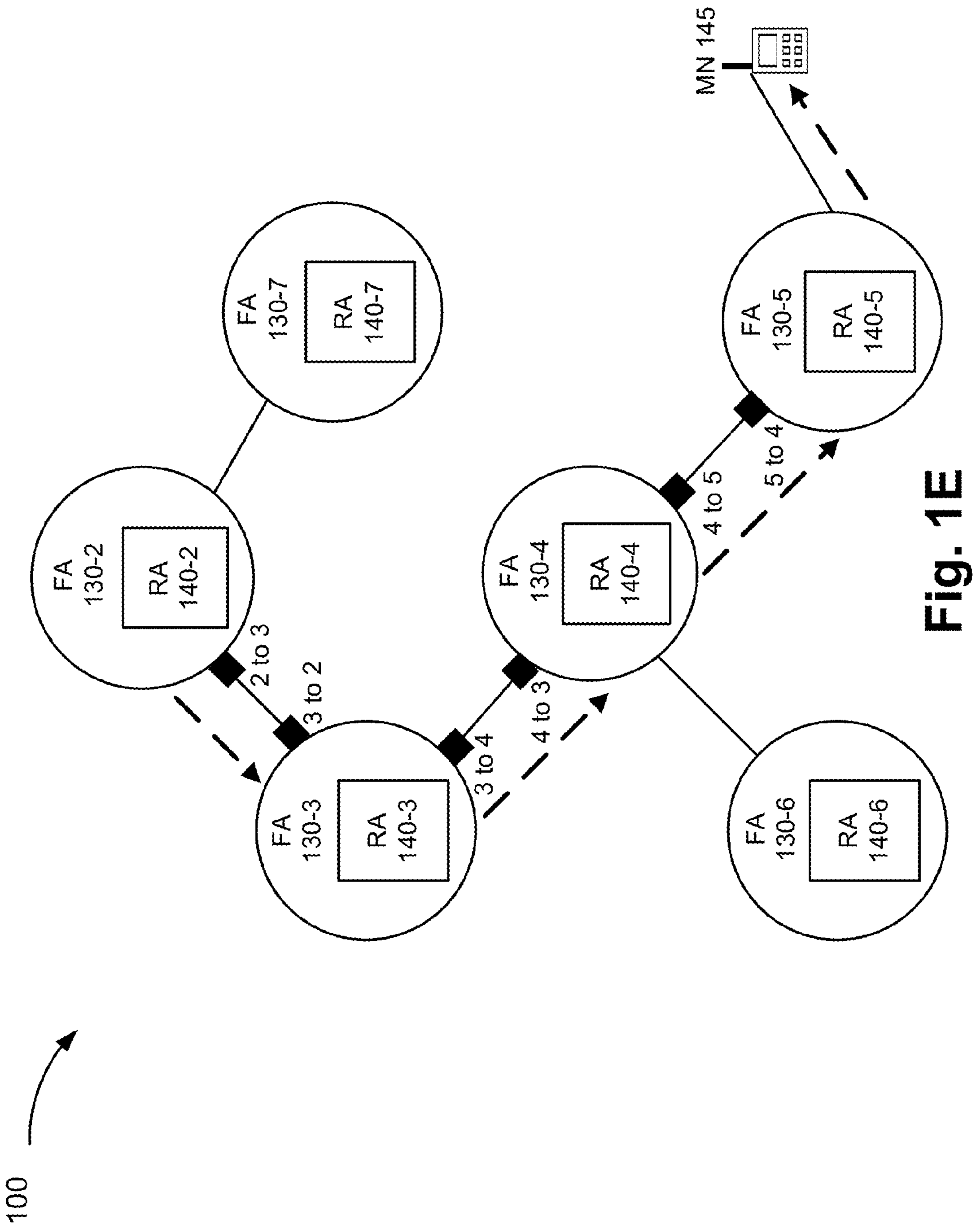
Figure 1F:
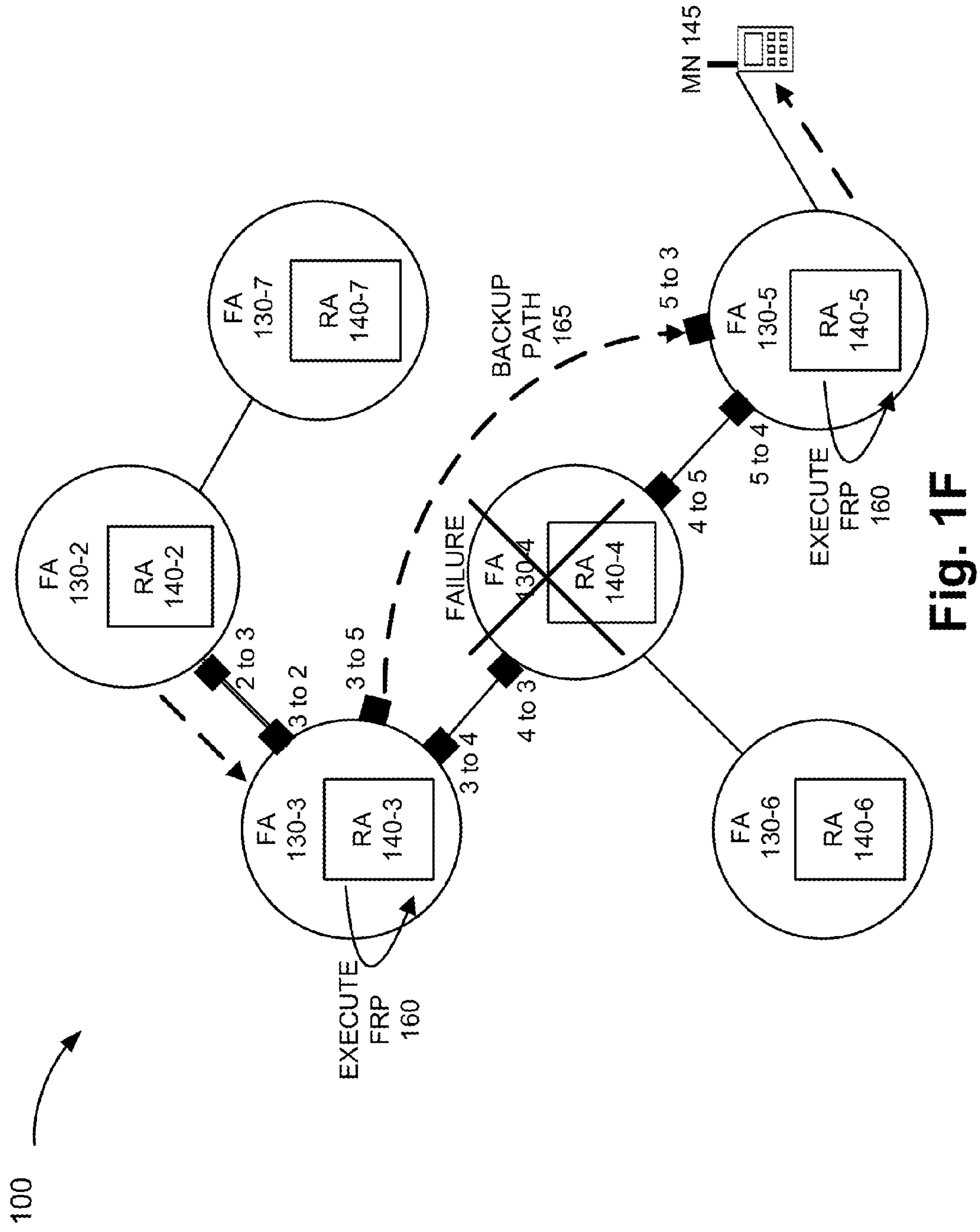

FIGS. 1C-1F are diagrams illustrating an exemplary process in which a fault-tolerance and resource management recovery may be implemented. As illustrated in FIG. 1C, RTM 135 of FA 130-1 may generate an FRP 150. By way of example, RTM 135 may generate the FRP based on capacity of resources, resource usage, and network topology. As illustrated in FIG. 1D, RTM 135 may load the FRP on FAs 130. Referring to FIG. 1E, traffic destined to MN 145 may traverse various interfaces associated with FAs 130-2, 130-3, 130-4, and 130-5. Referring to FIG. 1F, it may be assumed that a failure occurs with respect to FA 130-4. FAs 130-3 and/or FA 130-5 may detect the failure and execute FRP 160. For example, the FRP may create a backup path 165 between FA 130-3 and FA 130-5.

Since an exemplary embodiment has been broadly described, a more detailed description is provided below. As a result of the foregoing, the impact of network failure may be minimized. For example, according to the exemplary embodiment, fault recovery and resource management may be integrated to enhance overall reliability and service to users.

Figure 2:
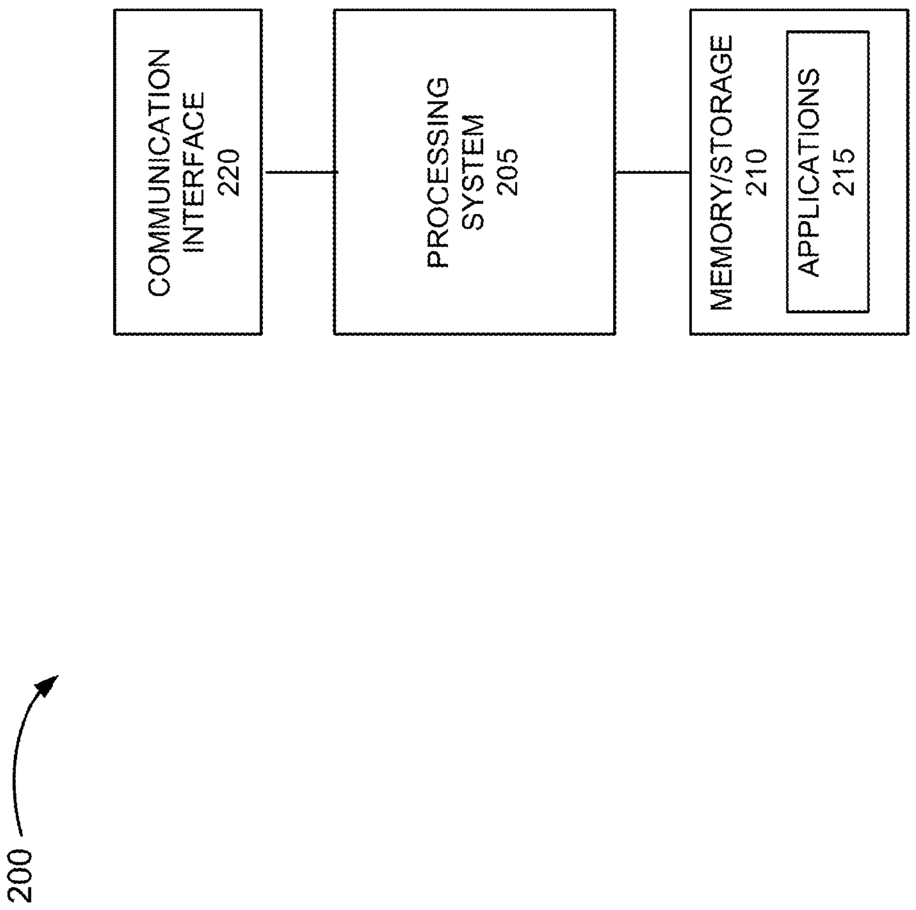
FIG. 2 is a diagram illustrating exemplary components of a device that may correspond to one or more of the devices in the exemplary network.

FIG. 2 is a diagram illustrating exemplary components of a device 200 that may correspond to one or more of the devices in network 100. For example, device 200 may correspond to HA 120, CN 125, FA 130, and/or MN 145. As illustrated, device 200 may include a processing system 205, memory/storage 210 including applications 215, and a communication interface 220. According to other implementations, device 200 may include fewer components, additional components, different components, and/or a different arrangement of components than those illustrated in FIG. 2 and described herein.

Processing system 205 may include one or more processors, microprocessors, data processors, co-processors, application specific integrated circuits (ASICs), controllers, programmable logic devices, chipsets, field programmable gate arrays (FPGAs), or some other component that may interpret and/or execute instructions and/or data. Processing system 205 may control the overall operation or a portion of operation(s) performable by device 200. Processing system 205 may perform one or more operations based on an operating system and/or various applications (e.g., applications 215).

Memory/storage 210 may include one or more memories and/or one or more secondary storages. For example, memory/storage 210 may include a random access memory (RAM), a dynamic random access memory (DRAM), a read only memory (ROM), a programmable read only memory (PROM), a flash memory, and/or some other type of memory. Memory/storage 210 may include a hard disk (e.g., a magnetic disk, an optical disk, a magneto-optic disk, a solid state disk, etc.) or some other type of computer-readable medium, along with a corresponding drive. Memory/storage 210 may include a memory, a storage device, or storage component that is external to and/or removable from device 200, such as, for example, a Universal Serial Bus (USB) memory stick, a hard disk, mass storage, off-line storage, etc.

The term “computer-readable medium,” as used herein, is intended to be broadly interpreted to include, for example, a memory, a secondary storage, a compact disc (CD), a digital versatile disc (DVD), or the like. The computer-readable medium may be implemented in a single device, in multiple devices, in a centralized manner, or in a distributed manner. Memory/storage 210 may store data, application(s), and/or instructions related to the operation of device 200.

Applications 215 may include software that provides various services or functions. For example, applications 215 may include one or more applications for fault-tolerance and resource management recovery, as described herein.

Communication interface 220 may permit device 200 to communicate with other devices, networks, systems and/or the like. Communication interface 220 may include one or multiple wireless interfaces and/or wired interfaces. Communication interface 220 may include a transmitter, a receiver, and/or a transceiver. Communication interface 220 may include interfaces according to Mobile-IP (MIP) and/or HMIP communication standards.

Device 200 may perform operations in response to processing system 205 executing software instructions contained in a computer-readable medium, such as memory/storage 210.

For example, the software instructions may be read into memory/storage 210 from another computer-readable medium or from another device via communication interface 220. The software instructions contained in memory/storage 210 may cause processing system 205 to perform processes described herein. Alternatively, device 200 may perform processes based on hardware, hardware and firmware, or hardware, software and firmware.

Figure 3A:
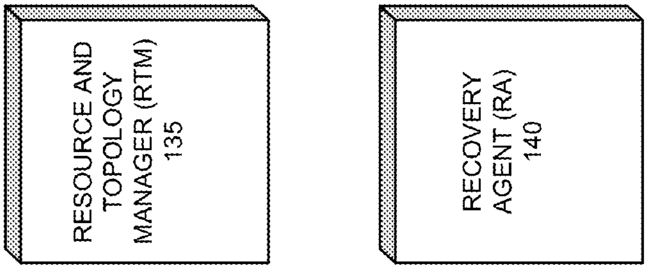
FIG. 3A is a diagram illustrating exemplary functional components associated with an exemplary implementation of a foreign agent (FA)

As previously described, RTM 135 and RA 140 may provide fault-tolerance and resource management. FIG. 3A is a diagram illustrating an exemplary functional component associated with an exemplary implementation of an FA 130. For example, FA 130 may include RTM 135 and/or RA 140. RTM 135 and/or RA 140 may be implemented as a combination of hardware (e.g., processing system 205, etc.) and software (e.g. applications 215, etc.) based on the components described with respect to FIG. 2. Alternatively, RTM 135 and/or RA 140 may be implemented as hardware and firmware, or hardware, software and firmware.

RTM 135 may be implemented on a dedicated network device or may be implemented on an existing network device (e.g., the GFA of a HMIP network) of a network (e.g., network 100). RTM 135 may be implemented on a single network device or on multiple network devices (e.g., a distributed system).

Referring to FIG. 3A, as previously described, RTM 135 may track current network topology and resource utilization associated with network devices (e.g., FAs 130) and links within network 100. RTM 135 may generate a failure recovery plan (FRP) for network devices within its scope. RTM 135 may provide the FRP to network devices relevant to the recovery process. When there is a topology change or some other event that impacts forwarding and resource allocation, RTM 135 may update the FRP. A further description of RTM 135 is provided below.

Figure 3B:
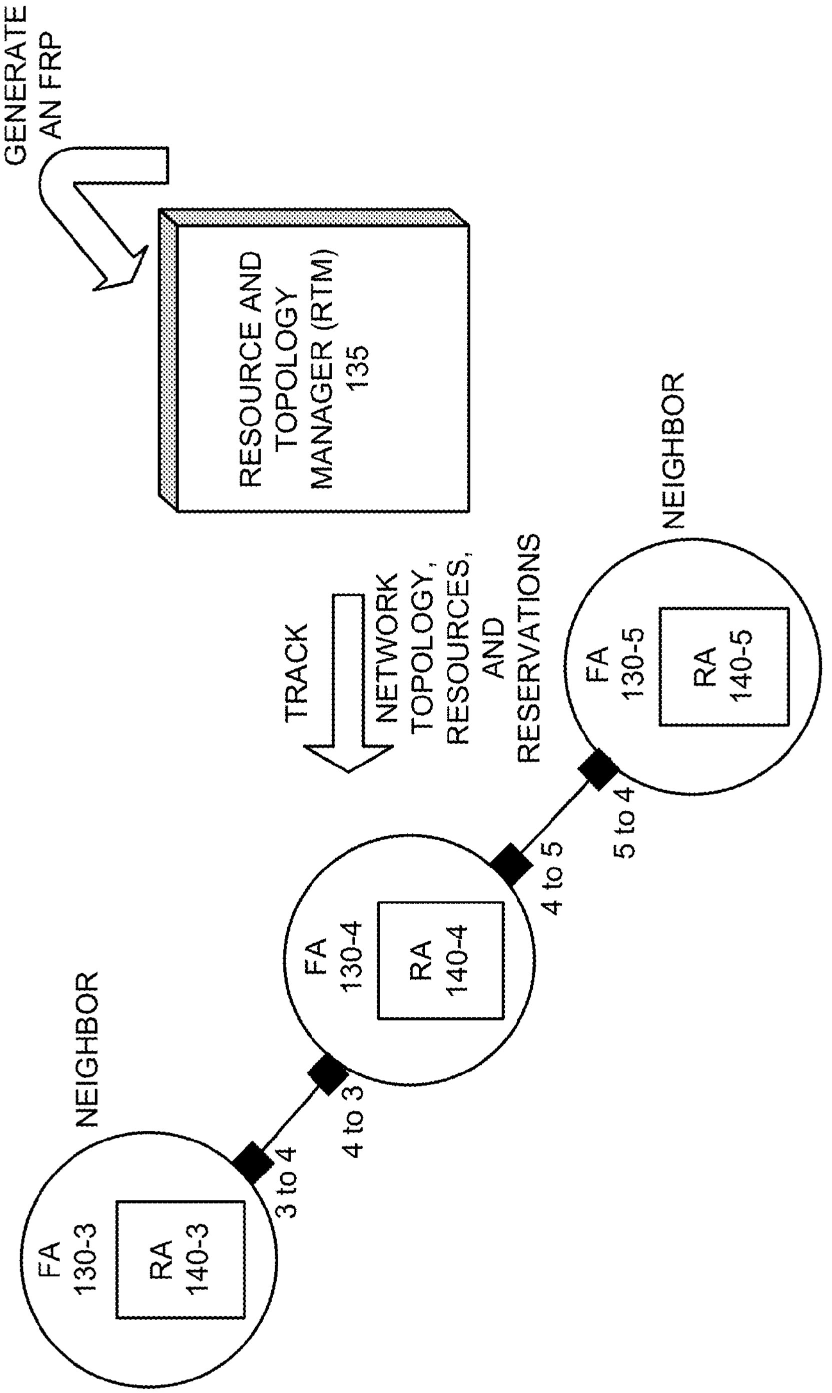
FIG. 3B is a diagram illustrating an exemplary process associated with a resource and topology manager (RTM)

As illustrated in FIG. 3B, RTM 135 may generate an FRP. The FRP may provide a recovery process in response to a failure. According to an exemplary implementation, RTM 135 may track information associated with network topology and resources. For example, as previously described with reference to FIG. 1F, a failure may occur at FA 130-4. According to this topology, FA 130-3 and FA 130-5 are interconnected to one FA (i.e., FA 130-4). For the sake of simplicity, it may be assumed that capacity and resources are identical in both directions between any two interfaces. However, according to other examples, the capacity and resources may be different, yet RTM 135 may generate the FRP in a similar manner.

Figure 3C:
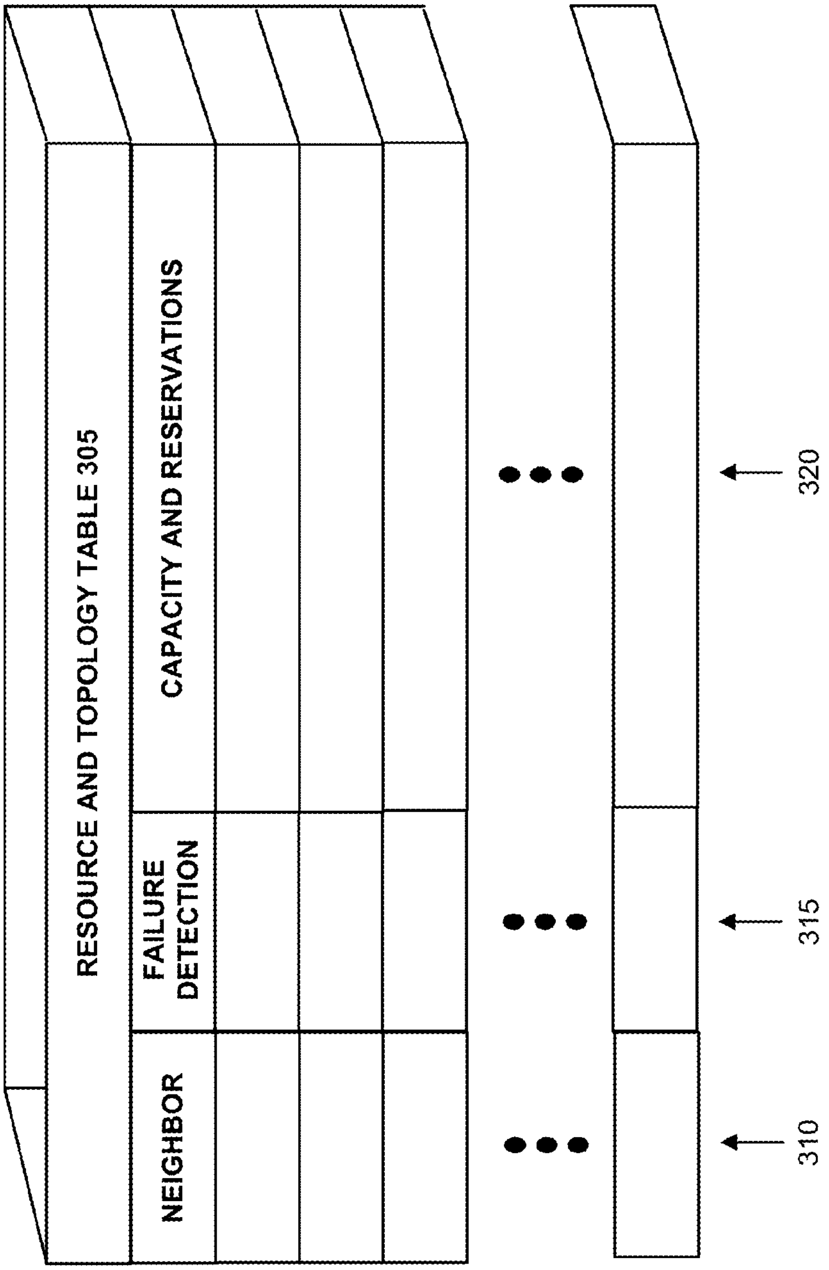
FIG. 3C is a diagram illustrating an exemplary resource and topology table.

RTM 135 may store information associated with FA 130-4. By way of example, the information may include a list of neighbors of FA 130-4, a list of network devices that may detect a failure associated with FA 130-4, and capacity and reservations of resource information. For example, as illustrated in FIG. 3C, a resource and topology table 305 may include a neighbor field 310, a failure detection field 315, and a capacity and reservations field 320.

According to this example, neighbor field 310 may include FA 130-3 and FA 130-5. Neighbor field 310 may also include interfaces associated with FA 130-3 (e.g., 3 to 4 interface) and FA 130-5 (e.g., 5 to 4 interface) with respect to FA 130-4. Detection field 315 may include FA 130-3 and FA 130-5 as network devices that may detect a failure associated with FA 130-4. Detection field 315 may also include interfaces associated with FA 130-3 (e.g., 3 to 4 interface) and FA 130-5 (e.g., 5 to 4 interface) with respect to FA 130-4. Capacity and reservations field 320 may include capacity and reservation information associated with FA 130-4 interfaces. For example, the 4 to 3 interface of FA 130-4 may have a 200 million bits per second (Mbps) capacity, in which a class 1 maximum reservation=40 Mbps, a class 2 maximum reservation=60 Mbps, and a class 3 maximum reservation=100 Mbps. The current reservation information for the 4 to 3 interface of FA 130-4 may be class 1 current reservation=10 Mbps; class 2 current reservation=30 Mbps; and class 3 current reservation=70 Mbps. Additionally, for example, the 4 to 5 interface of FA 130-4 may have a 100 Mbps capacity, in which a class 1 maximum reservation=20 Mbps, a class 2 maximum reservation=30 Mbps, and a class 3 maximum reservation=50 Mbps. The current reservation information for the 4 to 5 interface of FA 130-4 may be class 1 current reservation=10 Mbps; class 2 current reservation=20 Mbps; and class 3 current reservation=30 Mbps. The class or QoS class (i.e., class 1, class 2, and class 3) may represent a differentiated service scheme, such as, for example, IP precedence or Differentiated Service Code Point (DSCP) classification. A class may be associated with a particular set of performance metrics (e.g., throughput, packet loss, jitter, etc.).

Based on this information, RTM 135 may generate the FRP. For example, RTM 135 may identify one or more candidate backup paths that can be activated or enabled when a failure occurs. According to an exemplary embodiment, RTM 135 may select a backup path that satisfies the QoS requirements associated with the network device(s)/link(s) of an existing path before the failure occurs. RTM 135 may select the backup path based on the most recent information that includes the network topology, resources, and current reservations. In some instances, the backup path may be a temporary path until the failure can be fixed. In other instances, the backup path may be more permanent. Multiple technologies may be used to support the backup path, such as, for example, Asynchronous Transfer Mode (ATM), Multiprotocol Label Switching (MPLS), Transparent Local Area Network (LAN) service, and/or private lines.

In view of the on-demand nature of the backup path selection process, there may be instances when the use of the backup path may create a significant cost (e.g., to establish the backup path, when leasing is needed, etc.). Depending on the backup selected, RTM 135 may determine to limit the number of flows on the backup path in order to limit the needed resources. For example, according to an exemplary implementation, RTM 135 may identify a backup path and identify a corresponding flow migration policy. For example, the flow migration policy may dictate that existing flows that have been impacted by the failure may be assigned a priority level. According to an exemplary implementation, the priority level may be based on the QoS and service levels associated with the user. For example, a flow that belongs to a gold service may be assigned a higher priority level than another flow that belongs to a best-effort level of service. According to such an implementation, flows assigned a high priority level may have a smaller probability of being dropped and/or impacted by the failure. Conversely, flows assigned a low priority level may have a larger probability of being dropped and/or impacted by the failure. By way of example, RTM 135 may store a flow recovery profile with respect to a flow/traffic. The flow recovery profile may include information with which RTM 135 may use to select a backup path. For example, a gold flow recovery profile may indicate a normal class level=5 for a flow, in which the use of a lower class level (i.e., class level<5) is not permitted. In other words, when a failure occurs, RTM 135 is to select, if possible, a backup path that has a class level=5. However, a silver flow recovery profile, for example, may indicate a normal class level=5 for a flow, in which the use of a lower class level (i.e., class level<5, such as class 4 or class 3) is permitted. For example, when a failure occurs, RTM 135 may select a backup path between class level 3 and class level 5. The silver flow recovery profile may also indicate a maximum time allowed (e.g., 15 minutes) in the temporary recovery class before the flow is to be reverted back to the normal class level=5.

Network devices (e.g., FAs 130, etc.) may identify a flow by one or multiple criteria. By way of example, the flow may be identified based on precedence bits in an IP header, MPLS experimental (EXP) bits in an MPLS label, source and/or destination IP addresses, and/or port numbers.

Referring back to FIG. 3B, RTM 135 may generate the FRP based on the network topology, resources capacity, and resource reservations. In this example, the FRP may include FA 130-3 and FA 130-5 creating a backup path, as will be described further below.

Figure 3D:
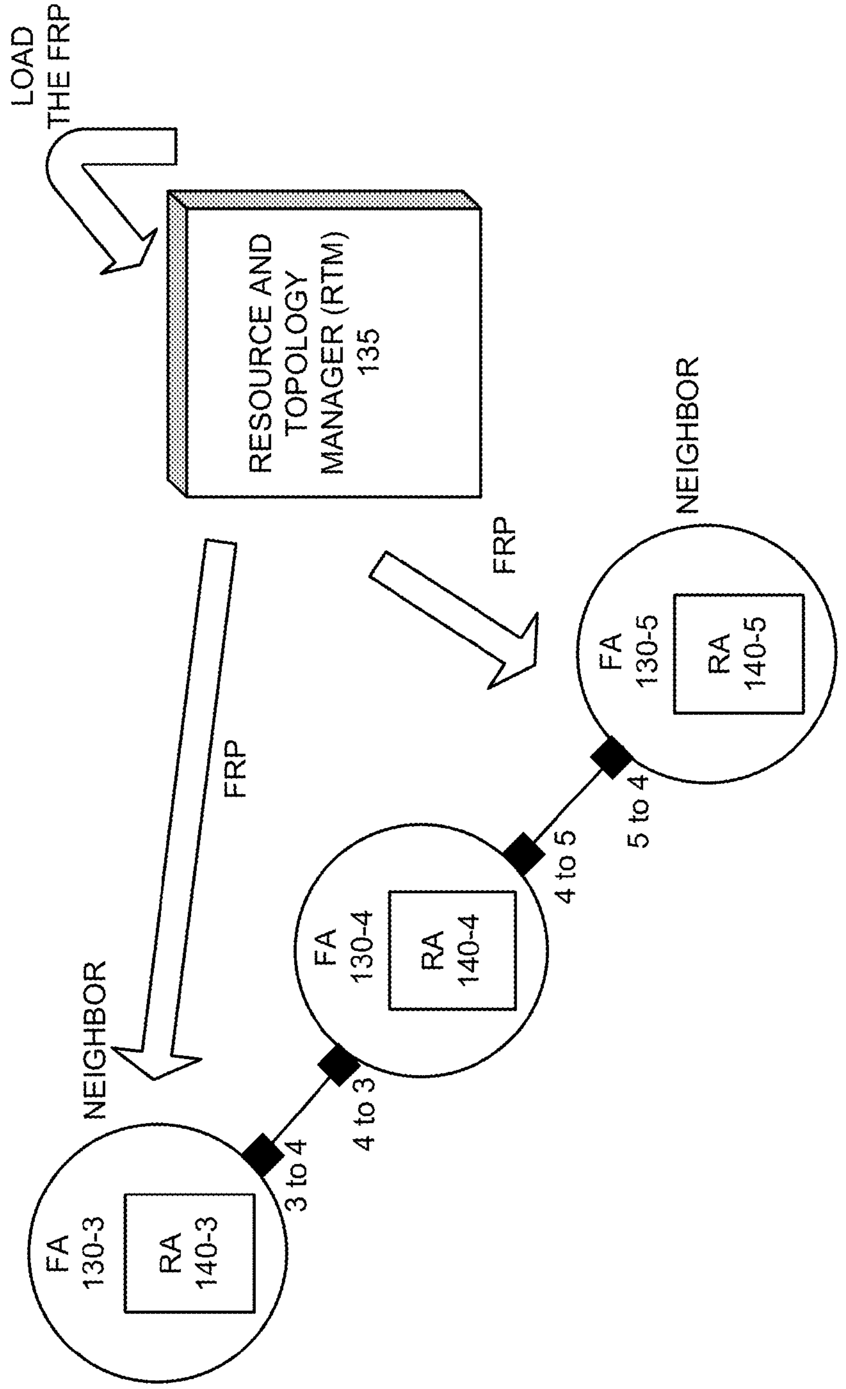
FIG. 3D is a diagram illustrating an exemplary process associated with the RTM.

As illustrated in FIG. 3D, when the FRP is generated, RTM 135 may load the FRP to one or more network devices. In this example, RTM 135 may load the FRP on FA 130-3 and FA 130-5. According to an exemplary loading process, RTM 135 may identify the relevant network devices that are involved in the failure detection and/or failure recovery. RTM 135 may communicate with each RA 140 associated with the network device (e.g., RA 140-3 and RA 140-5). When RTM 135 receives an acknowledgement from all RAs 140 that the FRP has been loaded, RAs 140 may be able to execute the fault recovery process based on the FRP. According to an exemplary implementation, RTM 135 may keep track of the last version of the FRP that has been loaded on each network device. For example, a sequence number may be used to track the different versions of the FRP.

There are multiple events that may trigger RTM 135 to consider updating the FRP. By way of example, the event may correspond to an updating of a link to a higher capacity or a lower capacity, changing the topology and network interconnectivity, changing a per class rate and/or capacity distribution, changing a flow recovery profile, or a changing in cost and/or availability of a backup path.

Referring back to FIG. 3A, as previously described, RA 140 may detect a failure in a network (e.g., network 100). RA 140 may receive the FRP and execute the FRP when the failure occurs. A further description of RA 140 is provided below.

Figure 3E:
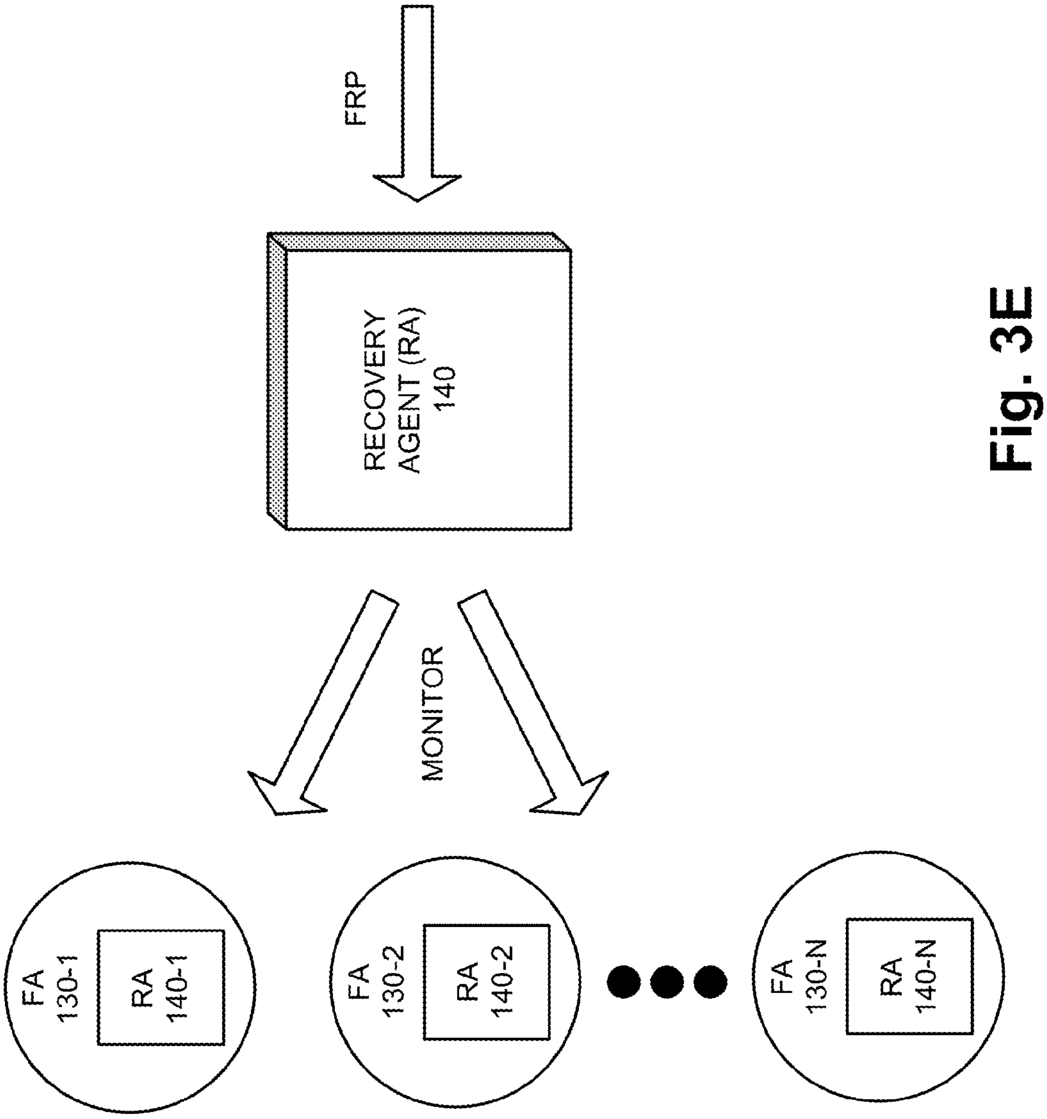
FIGS. 3E and 3F are diagrams illustrating exemplary processes associated with a recovery agent (RA)

The FRP may include, among other things, information that identifies the network devices that a particular RA 140 may need to monitor. For example, as illustrated in FIG. 3E, the FRP may indicate to RA 140 one or more FAs 130 or corresponding RAs 140 to monitor. In this example, RA 140-3 and/or RA 140-5 may monitor RA 140-4 of FA 130-4. The FRP may also identify to RA 140 the capabilities associated with the relevant RAs 140. According to an exemplary implementation, RAs 140 may exchange keep-alive messages with other network devices that are being monitored to detect a failure. The FRP may specify the frequency by which RA 140 sends the keep-alive messages. By way of example, the keep-alive message may include a version (e.g., =1 for version 1), a message code (e.g., for keep-alive mode, =1 for normal keep-alive), keep-alive type (e.g., =1 for keep-alive request; =2 for keep-alive response), a source system identifier (e.g., a system IP address for the network device sending the keep-alive message), and a destination system identifier (e.g., a system IP address for the destination system to receive the keep-alive message).

Upon receiving a keep-alive request, a network device (e.g., RA 140, etc.) should respond to the keep-alive request. When RA 140 does not receive a response from a monitored network device for a (configurable) period of time, RA 140 may determine that a failure has occurred.

According to another implementation, RA 140 may rely on an existing interface of a network device (e.g., FA 130) capable of monitoring neighboring network devices, such as, for example, an interface associated with an operating system level component or a protocol monitoring component, to determine that a failure has occurred.

Figure 3F:
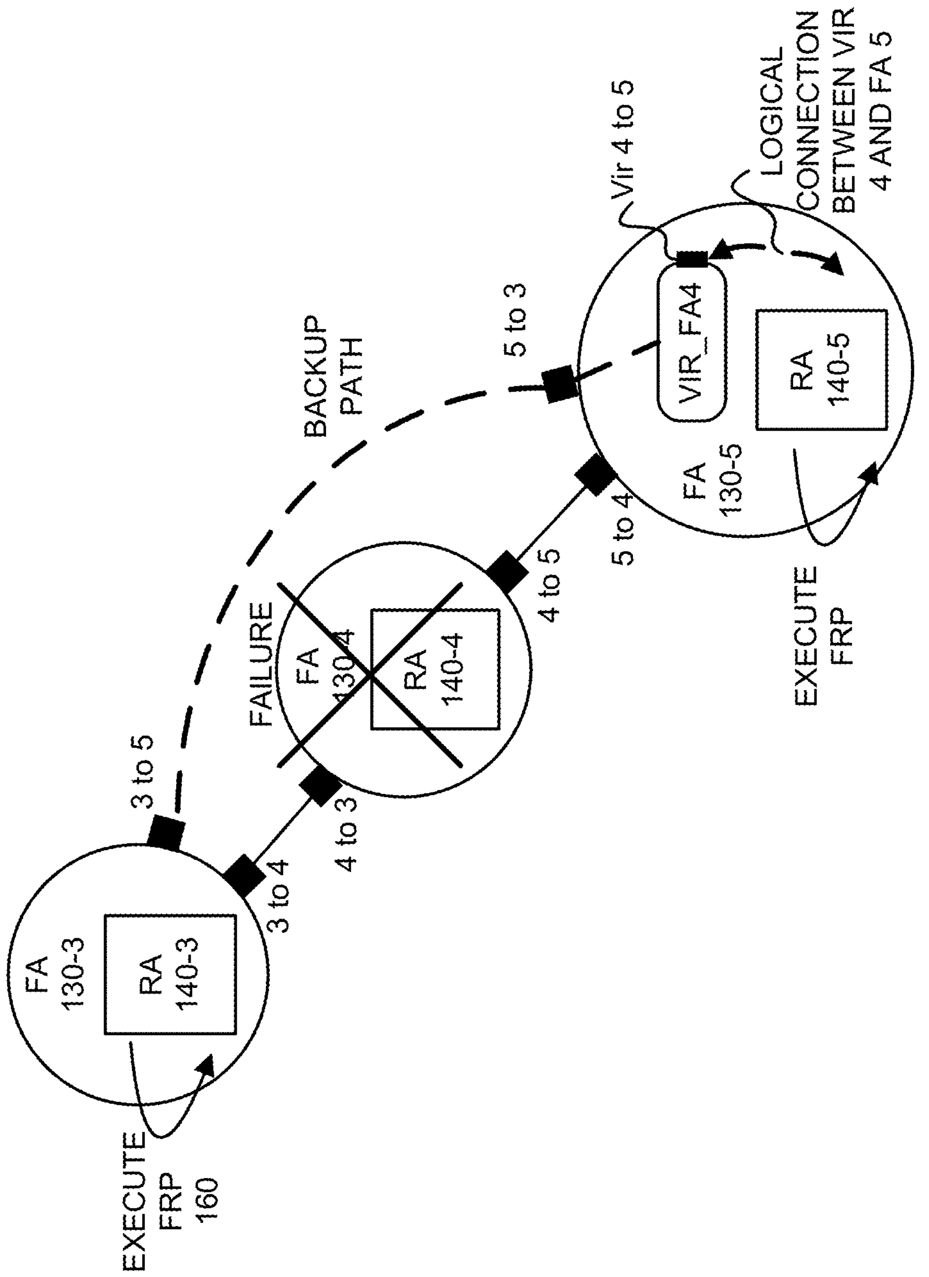

When RA 140 determines that a failure has occurred, RA 140 may execute the FRP associated with the failure (e.g., associated with the failed network device). As previously described, the FRP may include a recovery plan for creating a backup path. According to an exemplary embodiment, the recovery plan may avoid removing the existing modeled network path (i.e., the failed path), but create a new path (i.e., the backup path). According to an exemplary implementation, the recovery plan may include emulating the failed network device. For example as illustrated in FIG. 3F, RA 140-5 may create a virtual interface based on the FRP.

In this example, before the failure of FA 130-4, traffic to MN 145 follows the normal path of FA 130-1 to FA 130-2 to FA 130-3 to FA 130-4 to FA 130-5 to MN 145. FA 130-3 may identify the current location of MN 145 via FA 130-4. That is, no other information regarding the remaining path may be available to FA 130-3. Upon the failure of FA 130-4, a backup path is created between FA 130-3 and FA 130-5. To minimize the impact on the modeled path where resources are tracked, FA 130-5 may emulate encapsulation and tunneling aspects associated with the failed FA 130-4. For example, FA 130-5 may enable a virtual context (e.g., Vir. 4 to 5) to emulate the failed FA 130-4. According to an exemplary implementation, virtual 4 to 5 interface may be an object that may be created on FA 130-5. For example, virtual 4 to 5 interface may be implemented using approaches associated with virtual routers or logical routers. Shared resources or local dedicated resources associated with FA 130-5 may be used to support virtual 4 to 5 interface. By way of example, memory and processing associated with FA 130-5 may be dedicated or shared with respect to virtual 4 to 5 interface. According to such an implementation, traffic destined to MN 145 may be directed from FA 130-3 through 3 to 5 interface to FA 130-5 through 5 to 3 interface and terminate on virtual 4 to 5 interface. From virtual 4 to 5 interface, the traffic may be locally directed out of virtual 4 to 5 interface to FA 130-5, which may be forwarded to MN 145. For example, there may be a logical connection between virtual 4 to 5 interface and FA 130-5, as illustrated in FIG. 3F.

According to the exemplary embodiment, the failure associated with FA 130-4 may have minimum impact on the resource tracking system of RTM 135. Additionally, according to the exemplary embodiment, there may not be a need to remove the modeled failed path.

When the backup path is created, FA 130-3 and FA 130-5 may modify their local routing mechanisms so that the traffic is directed towards the appropriate interface. For example, FA 130-3 may modify its routing mechanism so that forwarding entries pointing to FA 130-4 are modified to use the 3 to 5 interface instead of the 3 to 4 interface for traffic destined to MN 145. Additionally, for example, virtual 4 to 5 interface may be provisioned with entries showing that traffic destined to MN 145 may be forwarded to FA 130-5. FA 130-5 may forward the traffic to MN 145 via the appropriate FA 130-5 to MN 145 interface (not illustrated).

As previously described, the backup path may be created to handle QoS, etc., as close as possible to the primary path that failed. Described below are examples relating to the backup path and QoS, service requirements, etc.

According to a first example, it may be assumed that the backup path cannot match the primary path in terms of QoS, etc. When RTM 135 identifies that the backup path cannot match the same level of service, etc., according to an exemplary implementation, RTM 135 may indicate that the backup path is to be used in a restricted access mode. One purpose of this mode is to identify which flows may keep their current level of service and which flows may be downgraded or terminated. By way of example, flows having a gold recovery profile may have a priority of being migrated to the backup path without a negative impact on the service level. Flow having a lower recovery profile (e.g., a silver recovery profile) may be migrated to the backup path with or without a service level downgrade. However, when allocated bandwidth for the different classes starts to exceed a pre-allocated threshold on the backup path, RTM 135 may assign those flows to a temporary recovery class per the flow recovery profiles. For example, as previously described, a flow having a silver recovery profile may be assigned a class level 3 versus a class level 5 on the backup path. Additionally, other restrictions may be implemented, such as, for example, restricting the period of time the flow can spend in the downgraded service level, etc.

When a new flow arrives, it may be allowed if there are sufficient resources to support it. According to one implementation, the new flow may be rejected if there are not sufficient resources to support it. According to another implementation, a priority level of the new flow may be compared with priority levels of other flows using the backup path. According to such an implementation, the new flow may cause a flow having a lower priority level to be terminated while allowing the new flow to use the backup path. RTM 135 may analyze the recovery profiles of the flows and try to minimize or eliminate flow termination due to the use of the backup path.

According to a second example, it may be assumed that the backup path can match the primary path in terms of QoS, etc. When RTM 135 identifies that the backup path can match the same level of service, etc., RTM 135 may migrate the flows to the backup path. During the migration process, according to an exemplary implementation, RTM 135 may track available resources and, in some cases, may reject any new flows to save available resources to accommodate the existing flows being migrated. According to other implementations, RTM 135 may allow new flows. For example, RTM 135 may give priority to flow having a higher priority level relative to an existing flow.

Although FIGS. 3A-3F illustrates exemplary functional components and processes associated therewith, according to other implementations, the network device (e.g., FA 130) may include additional functional components, fewer functional components, different functional components, different arrangement of functional components, and/or perform additional, fewer, and/or different processes than those illustrated in FIGS. 3A-3F and described herein.

To support resource management, typically a level of interaction between the resource reservation and topology exists. The level of interface may depend on the implementation approach. For example, the topology information may be maintained on a different system than a system that maintains the reservation information. According to such an implementation, there may be regular updates between the two systems. Alternatively, according to another implementation, both topology and resource management functions may reside on the same system. According to the embodiments described herein, either approach may be supported.

Figure 4:
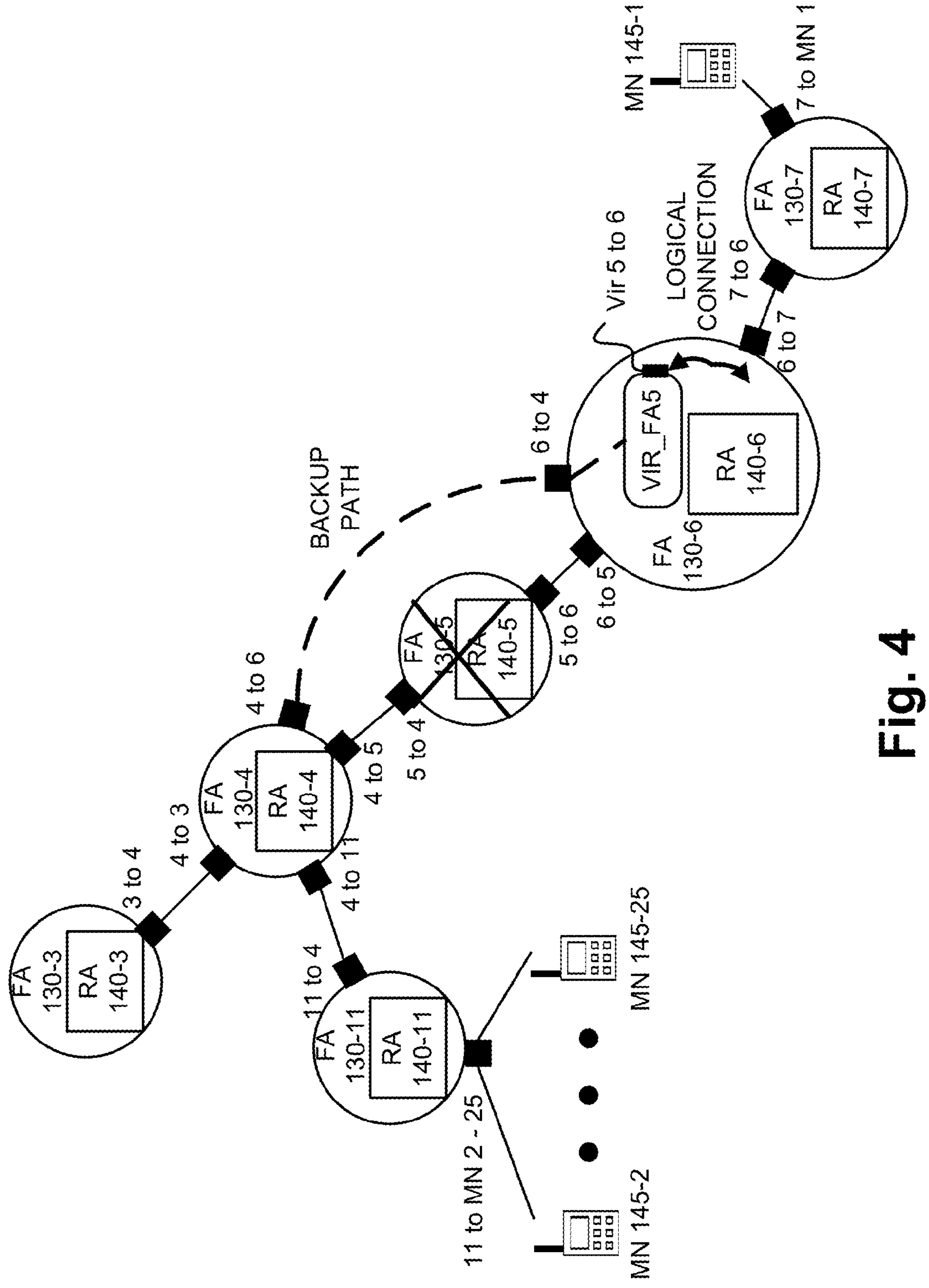
FIG. 4 is a diagram illustrating an exemplary network in which fault-tolerance and resource management recovery may be implemented.

By way of example and referring to FIG. 4, before the failure of FA 130-5, the resource reservation path may be represented according to the following in which the interface, the maximum capacity on the interface, and the reserved capacity on the interface may be specified. The capacity may be measured in Mbps. For example, 100/75 may refer to 75 Mbps reserved on a link with 100 Mbps maximum capacity on the link.

Resource reservation path for MN 145-2-MN 145-25 before failure:

3 to 4 interface=100/75
4 to 11 interface=100/72
11 to MN2-25 interface=72/72

Resource reservation path for MN 145-1 before failure:

3 to 4 interface=100/75
4 to 5 interface=100/3
5 to 6 interface=100/3
6 to 7 interface=100/3
7 to MN 1 interface=3/3

Upon the detection of a failure of FA 130-5, the existing resource reservation paths may not be deleted. Instead, according to an exemplary implementation, the maximum resource and reserved resource capacities may be modified, if needed. One benefit to such an implementation is to minimize the impact on the resource tracking process. That is, according an exemplary embodiment, RTM 135 may keep a mapping between the resource reservation paths and the current topologies. By way of example, assuming the maximum resource capacity of the backup path is limited (e.g., 80 Mbps), the reservation paths may be represented as follows:

Resource reservation path for MN 145-2-MN 145-25 after failure:

3 to 4 interface=100/75
4 to 11 interface=100/72
11 to MN2-25 interface=72/72

Resource reservation path for MN 145-1 after failure:

3 to 4 interface=100/75
4 to 5 interface=80/3 (maximum capacity updated)
5 to 6 interface=80/3 (maximum capacity updated)
6 to 7 interface=100/3
7 to MN 1 interface=3/3

With respect to mapping between topology and resource reservation information, the mapping may be represented as follows:

Before the failure of FA 130-5:

| RESOURCE RESERVATION INTERFACE | TOPOLOGY INTERFACE |
|---|---|
| 3 TO 4 | 3 TO 4 |
| 4 TO 5 | 4 TO 5 |
| 5 TO 6 | 5 TO 6 |
| 6 TO 7 | 6 TO 7 |
| 7 TO MN1 | 7 TO MN1 |

After the failure of FA 130-5:

| RESOURCE RESERVATION INTERFACE | TOPOLOGY INTERFACE |
|---|---|
| 3 TO 4 | 3 TO 4 |
| 4 TO 5 | 4 TO 6 (BACKUP PATH) |
| 5 TO 6 | VIR. 5 TO 6 (BACKUP PATH) |

-continued

| RESOURCE RESERVATION INTERFACE | TOPOLOGY INTERFACE |
|---|---|
| 6 TO 7 | 6 TO 7 |
| 7 TO MN1 | 7 TO MN1 |

Figure 5:
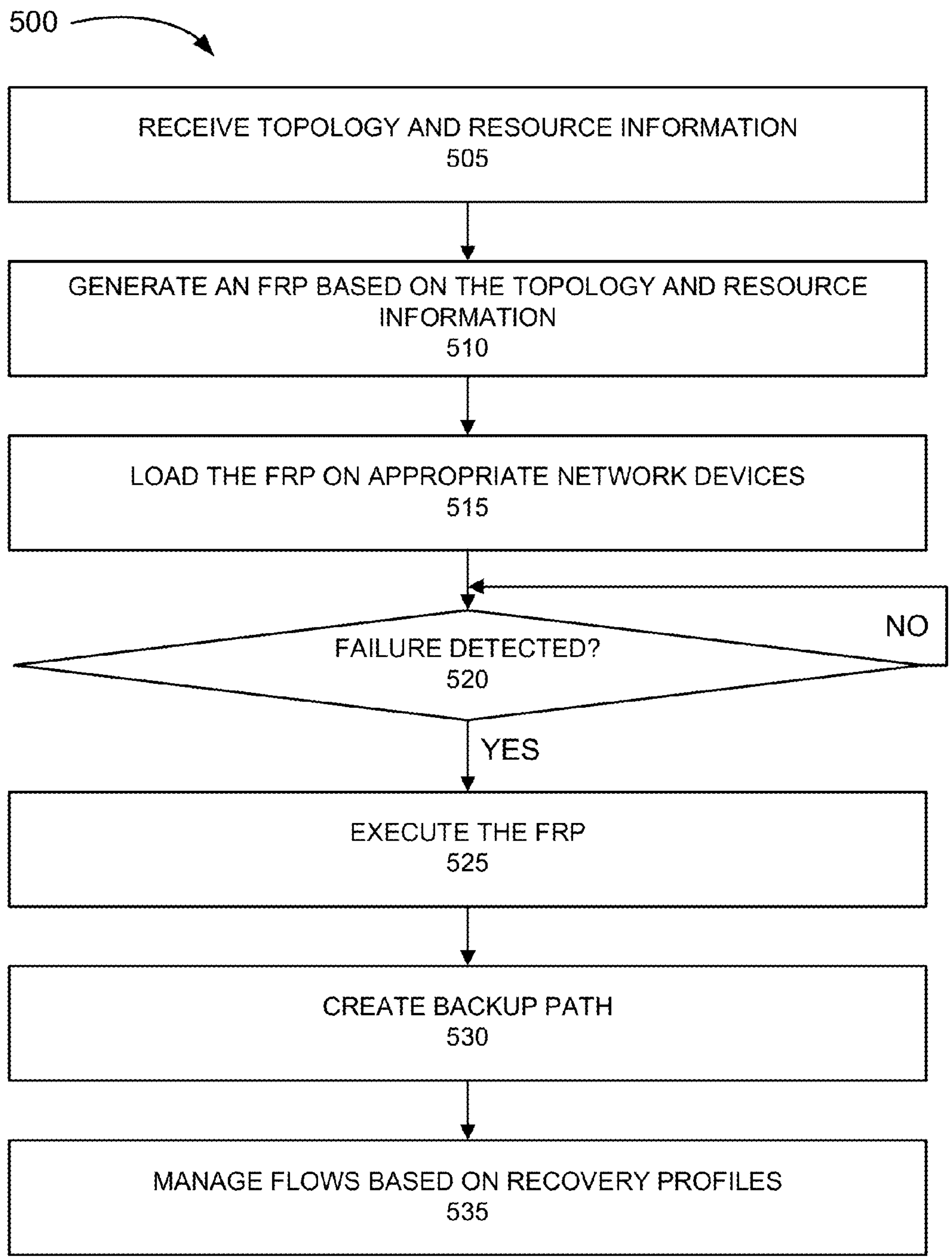
FIG. 5 is a flow diagram illustrating an exemplary process for performing a fault-tolerant and resource management recovery.

FIG. 5 is a flow diagram illustrating an exemplary process 500 for performing a fault-tolerance and resource management recovery. According to an exemplary embodiment, process 500 may be performed by FA 130. According to other implementations, process 500 may be performed by a different type of node associated with a network.

Process 500 may include receiving topology and resource information (block 505). For example, as previously described, RTM 135 may receive network topology information and resource information (e.g., resource capacity information, resource reservation information, resource usage information, etc.).

An FRP may be generated based on the topology and resource information (block 510). For example, as previously described, RTM 135 may generate an FRP based on the network topology information and resource information. RTM 135 may also generate the FRP based on other types of information, such as, for example, flow recovery profiles, etc. RTM 135 may generate an FRP for one or more network devices.

The FRP may be loaded on the appropriate network devices (block 515). For example, as previously described, RTM 135 may load one or more FRPs on one or more RAs 140.

It may be determined whether a failure is detected (block 520). For example, as previously described, RA(s) 140 may detect when a failure occurs in the network. By way of example, RA(s) 140 may send keep-alive messages to other network devices or rely on existing interfaces associated with, for example, an operating system level component or a protocol monitoring component. RA(s) 140 may determine when a failure occurs when keep-alive response messages are not received or existing interfaces/components determine a failure occurs.

If it is determined that a failure is not detected (block 520—NO), failure detection may continue, as illustrated in FIG. 5. If it is determined that a failure is detected (block 520—YES), the FRP may be executed (block 525). For example, as previously described, RA(s) 140 may execute the FRP in response to the detected failure.

A backup path may be created (block 530). For example, as previously described, RA(s) 140 may create a backup path based on the FRP. According to an exemplary implementation, the creation of the backup path may include the creation of a virtual interface that emulates the failed network device. Additionally, the creation of the backup path may include enabling a tunnel termination point, adjusting routing entries, etc.

Flows may be managed based on recovery profiles (block 535). For example, as previously described, flows on the backup path may be managed on recovery flow profiles. Additionally, flows on the backup path may be managed according to time restrictions, etc.

Although FIG. 5 illustrates an exemplary process 500 for performing a fault-tolerance and resource management recovery, according to other implementations, process 500 may include additional operations, fewer operations, and/or different operations than those illustrated in FIG. 5 and described.

The foregoing description of implementations provides illustration, but is not intended to be exhaustive or to limit the implementations to the precise form disclosed. Accordingly, modifications to the implementations described herein may be possible.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 5, the order of the blocks may be modified in other implementations. Further, non-dependent blocks may be performed in parallel. Additionally, with respect to other processes described in this description, the order of operations may be different according to other implementations, and/or operations may be performed in parallel.

It will be apparent that the embodiments described herein may be implemented in many different forms of software or firmware in combination with hardware in the implementations illustrated in the figures. The actual software code (executable by hardware) or specialized control hardware used to implement the device, method, and/or system does not limit the disclosure of the invention. Thus, the operation and behavior of the devices and/or systems, or the performing of the methods was described without reference to the specific software code—it being understood that software and control hardware can be designed to implement the device, method, and/or system based on the description herein.

Further certain features described above may be implemented as "logic" or a "component" that performs one or more functions. This logic or component may include hardware, such as one or more processors, one or more microprocessors, one or more ASICs, one or more FPGAs, etc., a combination of hardware and software, or a combination with firmware, etc.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

No element, act, or instruction used in the present application should be construed as critical or essential to the implementations described herein unless explicitly described as such.

What is claimed is:

1. A method comprising:

receiving, by one or more network devices, network topology and resource management information;

generating, by the one or more network devices, a mapping between the network topology of a network and resource reservation paths associated with flows using the network based on the network topology and resource management information;

generating, by the one or more network devices, a failure recovery plan (FRP) based on the mapping, wherein the FRP instructs one or more other network devices on how to manage a failure such that one or more resource reservation paths associated with flows impacted by the failure are not deleted and a virtual interface is created that emulates an interface of a failed network device;

loading, by the one or more network devices, the FRP on the one or more other network devices;

detecting the failure;

executing the FRP, by the one or more other network devices, wherein the executing comprises:

creating a backup path, wherein the creating comprises:

creating, on one of the one or more other network devices, the virtual interface that emulates the interface of the failed network device; and creating a connection between the virtual interface and a physical interface on the one of the one or more other network devices; and migrating the flows impacted by the failure to the backup path.

2. The method of claim 1, further comprising:

tracking a version of the FRP that is loaded on the one or more other network devices; and updating the version of the FRP in response to a change in the network topology.

3. The method of claim 1, wherein a quality of service provided to the flows on the backup path are based on priority levels associated with the flows.

4. The method of claim 1, wherein an emulation of the interface of the failed network device comprises:

emulating encapsulation and tunneling associated with the failed network device.

5. The method of claim 1, wherein the FRP specifies a frequency by which the one or more other network devices transmit keep-alive messages, and wherein the detecting comprises:

detecting the failure based on the keep-alive messages.

6. The method of claim 1, further comprising:

modifying at least one of a maximum resource value or a resource reservation value in relation to the one or more resource reservation paths.

7. The method of claim 3, further comprising:

determining whether one or more of the flows are to be terminated and not migrated to the backup path based on one or more priority levels associated with the one or more flows.

8. The method of claim 3, further comprising:

assigning a lower quality of service for one or more of the flows relative to corresponding one or more priority levels; and setting a time limit for the lower quality of service.

9. A network device comprising:

a communication interface, wherein the communication interface includes a transmitter and a receiver;

a memory, wherein the memory stores instructions;

a processor, wherein the processor executes the instruction to:

receive, via the communication interface, network topology and resource management information;

generate a mapping between the network topology of a network and resource reservation paths associated with flows using the network based on the network topology resource management information;

generate a failure recovery plan (FRP) based on the mapping, wherein the FRP instructs one or more other network devices on how to manage a failure such that one or more resource reservation paths associated with flows impacted by the failure are not deleted and a virtual interface is created that emulates an interface of a failed network device, and wherein a connection is created between the virtual interface and a physical interface on one of the one or more other network devices; and load, via the communication interface, the FRP on the one or more other network devices.

10. The network device of claim 9, wherein the processor further executes the instructions to:

track a version of the FRP that is loaded on the one or more other network devices; and update the version of the FRP in response to a change in the network topology.

11. The network device of claim 9, wherein the FRP instructs the one or more other network devices to create a backup path, and migrate the flows impacted by the failure to the backup path, wherein a quality of service provided to the flows on the backup path are based on priority levels associated with the flows.

12. The network device of claim 11, wherein the FRP instructs the one or more other network devices to assign a lower quality of service for one or more of the flows relative to corresponding one or more priority levels, and set a time limit for the lower quality of service.

13. A network device comprising:

a communication interface, wherein the communication interface includes a transmitter and a receiver;

a memory, wherein the memory stores instructions; and a processor, wherein the processor executes the instructions to:

receive, via the communication interface, a failure recovery plan (FRP), wherein the FRP is generated based on a mapping between a network topology of a network and resource reservation paths associated with flows using the network, and wherein the FRP instructs the network device on how to manage a failure such that one or more resource reservation paths associated with flows impacted by the failure are not deleted, and to create a backup path that includes to create a virtual interface, on the network device, that emulates an interface of a failed network device, create a connection between the virtual interface and a physical interface on the network device, and migrate the flows impacted by the failure to the backup path;

detect the failure in the network; and execute the FRP, when the failure is detected.

14. The network device of claim 13, wherein a quality of service provided to the flows on the backup path are based on priority levels associated with the flows.

15. The network device of claim 13, wherein the processor further executes the instructions to:

emulate encapsulation and tunnel associated with the failed network device.

16. The network device of claim 14, wherein the processor further executes the instructions to:

determine whether one or more of the flows are to be terminated and not migrated to the backup path based on one or more priority levels associated with the one or more flows.

17. The network device of claim 14, wherein the processor further executes the instructions to:

assign a lower quality of service for one or more of the flows relative to corresponding one or more priority levels; and set a time limit for the lower quality of service.

18. A non-transitory medium that stores instructions executable by a processor of a network device, the instructions comprising instructions to:

receive network topology and resource management information of a network;

generate a mapping between the network topology of the network and resource reservation paths associated with flows using the network based on the network topology resource management information;

generate a failure recovery plan (FRP) based on the mapping, wherein the FRP instructs one or more other network devices on how to manage a failure such that one or more resource reservation paths associated with flows impacted by the failure are not deleted and a virtual interface is created that emulates an interface of a failed network device, and wherein a connection is created between the virtual interface and a physical interface on one of the one or more other network devices; and load the FRP on the one or more other network devices.

19. The non-transitory medium of claim 18, further storing instructions to:

track a version of the FRP that is loaded on the one or more other network devices; and update the version of the FRP in response to a change in the network topology.

20. The non-transitory medium of claim 18, wherein the FRP instructs the one or more other network devices to create a backup path, and migrate the flows impacted by the failure to the backup path, wherein a quality of service provided to the flows on the backup path are based on priority levels associated with the flows.

21. The non-transitory medium of claim 18, wherein the FRP specifies a frequency by which the one or more other network devices transmit keep-alive messages.

22. The non-transitory medium of claim 20, wherein the FRP instructs the one or more other network devices to assign a lower quality of service for one or more of the flows relative to corresponding one or more priority levels, and set a time limit for the lower quality of service.

* * * * *